(12) United States Patent
Fujiwara et al.

(10) Patent No.: US 12,441,562 B2
(45) Date of Patent: Oct. 14, 2025

(54) DEVICE FOR ASSESSING POSITION OF CONVEYANCE VEHICLE

(71) Applicant: KOBELCO CONSTRUCTION MACHINERY CO., LTD., Hiroshima (JP)

(72) Inventors: Sho Fujiwara, Hiroshima (JP); Yukihiro Hoso, Hiroshima (JP); Shingun Kyu, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 338 days.

(21) Appl. No.: 17/763,092

(22) PCT Filed: Jul. 6, 2020

(86) PCT No.: PCT/JP2020/026364
§ 371 (c)(1),
(2) Date: Mar. 23, 2022

(87) PCT Pub. No.: WO2021/059658
PCT Pub. Date: Apr. 1, 2021

(65) Prior Publication Data
US 2022/0388791 A1 Dec. 8, 2022

(30) Foreign Application Priority Data
Sep. 26, 2019 (JP) .................................. 2019-176036

(51) Int. Cl.
B65G 67/04 (2006.01)
G01C 3/00 (2006.01)
G01S 17/08 (2006.01)

(52) U.S. Cl.
CPC ............... *B65G 67/04* (2013.01); *G01C 3/00* (2013.01); *G01S 17/08* (2013.01)

(58) Field of Classification Search
CPC ............ B65G 67/04; G01C 3/00; G01S 17/08
See application file for complete search history.

(56) References Cited

U.S. PATENT DOCUMENTS

2013/0261885 A1   10/2013   Hargrave, Jr. et al.
2013/0261903 A1   10/2013   Hargrave, Jr. et al.
(Continued)

FOREIGN PATENT DOCUMENTS

CN   104781477 A    7/2015
EP   3 412 838 A1   12/2018
(Continued)

OTHER PUBLICATIONS

Combined Chinese Office Action and Search Report issued Nov. 15, 2022 in Patent Application No. 202080066937.2 (with English machine translation and English translation of Category of Cited Documents), 15 pages.

(Continued)

*Primary Examiner* — Aaron L Troost
(74) *Attorney, Agent, or Firm* — Oblon, McClelland, Maier &Neustadt, L.L.P.

(57) ABSTRACT

The transport vehicle position estimating device includes: a distance image acquiring part for acquiring a distance image of a box bed; and a calculation part. The calculation part sets a box bed scope indicative of a positional extent of the box bed on the basis of the distance image of the box bed acquired by the distance image acquiring part. The calculation part acquires a dischargeable region indicative of a dischargeable extent of the attachment under the condition that the attachment is operated but the lower travelling body is not travelled. The calculation part determines whether the box bed scope falls within the dischargeable region.

12 Claims, 3 Drawing Sheets

(56) References Cited

U.S. PATENT DOCUMENTS

| | | | |
|---|---|---|---|
| 2014/0316665 A1 | 10/2014 | Hargrave, Jr. et al. | |
| 2015/0308070 A1* | 10/2015 | Deines | E02F 3/434 |
| | | | 701/50 |
| 2016/0224026 A1 | 8/2016 | Hamada et al. | |
| 2016/0238403 A1* | 8/2016 | Brown | G01C 21/3632 |
| 2019/0093311 A1 | 3/2019 | Naito | |
| 2020/0018049 A1 | 1/2020 | Takahama et al. | |
| 2020/0240110 A1 | 7/2020 | Takahama et al. | |
| 2021/0002852 A1* | 1/2021 | Nishi | E02F 9/2282 |
| 2021/0032837 A1 | 2/2021 | Naito | |
| 2021/0064050 A1* | 3/2021 | Pickett | G05D 1/0044 |
| 2022/0167543 A1* | 6/2022 | Bast | G05D 1/0223 |
| 2022/0374020 A1* | 11/2022 | Tahiliani | G06Q 10/06315 |

FOREIGN PATENT DOCUMENTS

| | | |
|---|---|---|
| JP | 6-19547 A | 1/1994 |
| JP | 11-124880 A | 5/1999 |
| JP | 2000-192514 A | 7/2000 |
| JP | 2001-91345 A | 4/2001 |
| JP | 2019-54464 A | 4/2019 |
| JP | 2019-54465 A | 4/2019 |

OTHER PUBLICATIONS

International Search Report mailed on Sep. 24, 2020 in PCT/JP2020/026364 filed on Jul. 6, 2020, 2 pages.

Extended European Search Report issued Oct. 14, 2022 in European Patent Application No. 20869069.3, 8 pages.

Combined Chinese Office Action and Search Report issued Apr. 5, 2023, in corresponding Chinese Patent Application No. 202080066937.2 (with Partial English Translation and English Translation of Category of Cited Documents), 9 pages.

* cited by examiner

DEVICE FOR ASSESSING POSITION OF CONVEYANCE VEHICLE

TECHNICAL FIELD

The present invention relates to a transport vehicle position estimating device for estimating a position of a transport vehicle with respect to a working machine.

BACKGROUND ART

For example, Patent Literature 1 discloses a technique of estimating a position of a transport vehicle with respect to a working machine. In the technique disclosed in Patent Literature 1, a distance between a front surface (an erect wall) of a box bed of the transport vehicle and an outer surface of a bucket ("L2" in FIG. 3 of Patent Literature 1) is measured (see Paragraph [0018] of Patent Literature 1). On the basis of the measured distance and the known dimensions of the transport vehicle and the working machine, a distance from a lower travelling body of the working machine to the transport vehicle ("L5" in FIG. 3 of Patent Literature 1) is calculated (see Paragraph [0019] of Patent Literature 1). Subsequently, the distance from the lower travelling body to the transport vehicle is compared with a target distance ("L1" in FIG. 3 of Patent Literature 1) (see Paragraph [0020] of Patent Literature 1).

The technique disclosed in Patent Literature 1 requires that a length from a rear to a front of the transport vehicle ("L4" in FIG. 3 of Patent Literature 1) be known. However, this length varies according to the kind of transport vehicle. Therefore, the position of the transport vehicle with respect to the working machine cannot be estimated when the kind of transport vehicle is changed.

CITATION LIST

Patent Literature

Patent Literature 1: Japanese Unexamined Patent Publication No. HEI06-19547

SUMMARY OF INVENTION

In view thereof, an object of the present invention is to provide a transport vehicle position estimating device that can estimate a position of a transport vehicle with respect to a working machine even when the kind of transport vehicle is changed.

A transport vehicle position estimating device is used in a working machine having an attachment for carrying and discharging a load of matter to a box bed provided on a transport vehicle. The transport vehicle position estimating device includes a distance image acquiring part and a calculation part. The distance image acquiring part acquires a distance image of the box bed. The calculation part sets a box bed scope indicative of a positional extent of the box bed on the basis of the distance image of the box bed acquired by the distance image acquiring part. The calculation part acquires a dischargeable region. The dischargeable region is indicative of a dischargeable extent of the attachment. The calculation part determines whether at least a part of the box bed scope falls within the dischargeable region.

BRIEF DESCRIPTION OF DRAWINGS

FIG. 2 is a side view of the working machine 20 shown in FIG. 1, showing a dischargeable region B and the like.

DESCRIPTION OF EMBODIMENTS

Figure 1:
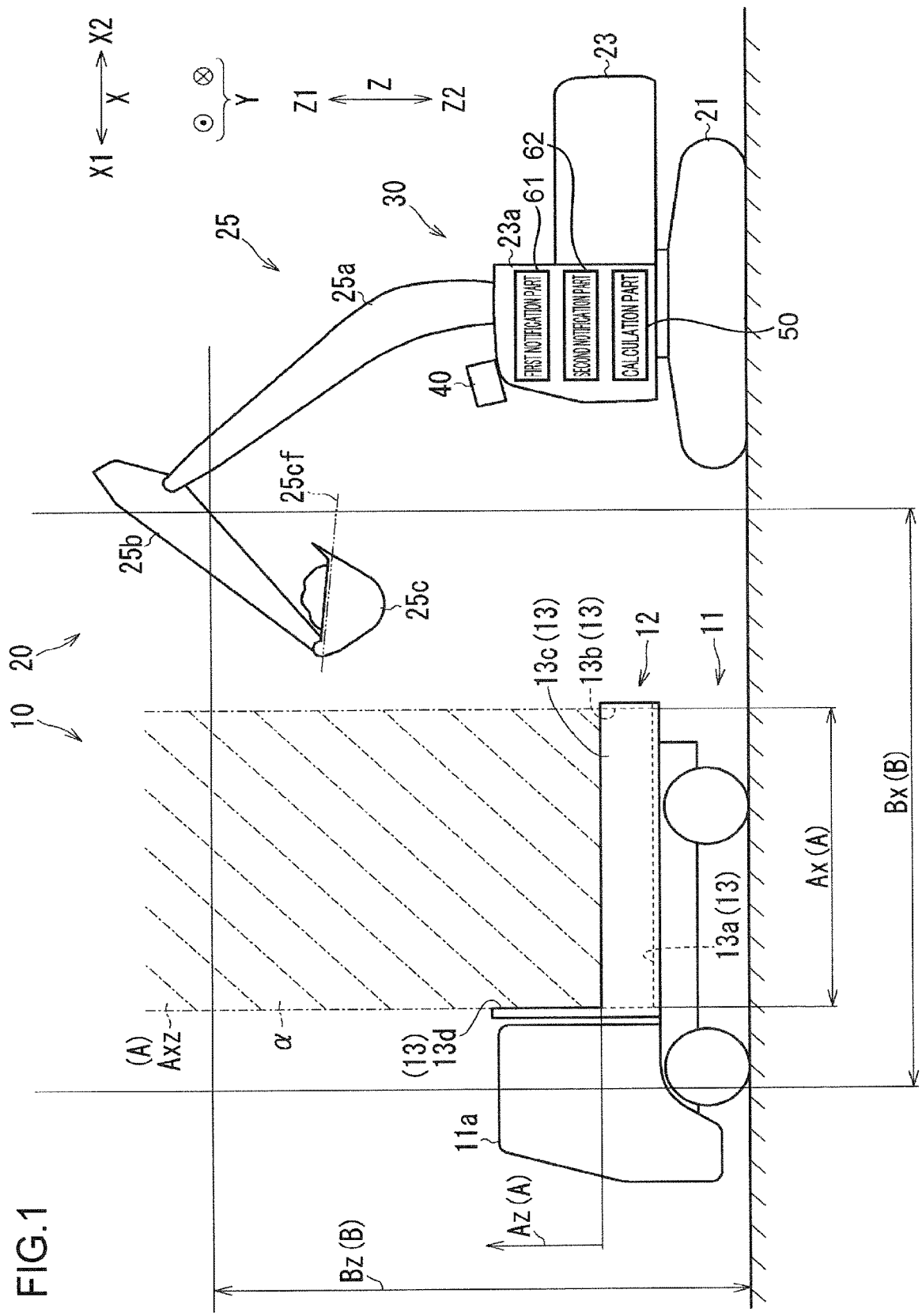
FIG. 1 is a side view of a transport vehicle 10 and a working machine 20 in which a transport vehicle position estimating device 30 is used.

A transport vehicle position estimating device 30 shown in FIG. 1, and a transport vehicle 10 and a working machine 20 in which the transport vehicle position estimating device 30 is used will be described with reference to FIG. 1 to FIG. 3.

The transport vehicle 10 is a vehicle including a box bed 12. The transport vehicle 10 is a vehicle for transporting a mass of matter (transport matter) that is loaded by the working machine 20, such as a dump truck and a truck. The transport vehicle 10 includes a main body part 11 and the box bed 12. The main body part 11 is capable of travelling, and supports the box bed 12. The main body part 11 includes an operating room 11a.

The box bed 12 contains the transport matter. The transport matter placed in the box bed 12 is, for example, earth and sand, or wastes. The box bed 12 is provided behind the operating room 11a or on a rear portion of the transport vehicle 10. Hereinafter, a direction from the operating room 11a to the box bed 12 is referred to as "rearward of the transport vehicle", and a direction from the box bed 12 to the operating room 11a is referred to as "forward of the transport vehicle". The box bed 12 is movable against the main body part 11, or may be fixedly provided on the main body part 11. The box bed 12 defines a flat face part 13.

The flat face part 13 is a section of the box bed 12 that is flat or substantially flat. The flat face part 13 includes a floor surface 13a, a rear surface 13b, side surfaces 13c, and a front surface 13d. The flat face part 13 (including the floor surface 13a) appears to be largely flat or substantially flat over the whole extent. The flat face part 13 may have a recess or a projection, or a generally curved surface to some extent. The floor surface 13a is a bottom surface of the box bed 12. The rear surface 13b is a surface of the box bed 12 that is rearward in view of the transport vehicle, and protrudes upwardly from a section of the floor surface 13a that is rearward in view of the transport vehicle. The side surfaces 13c correspond to left and right surfaces of the box bed 12 (see FIG. 3), and protrude upwardly from left and right end sections of the floor surface 13a. The front surface 13d is a surface of the box bed 12 that is forward in view of the transport vehicle, and protrudes upwardly from a section of the floor surface 13a that is forward in view of the transport vehicle. The front surface 13d protrudes more upwardly than the side surfaces 13c and the rear surface 13b.

The working machine 20 is a machine for performing a work of loading a mass of matter to the box bed 12. The working machine 20 may be, for example, capable of shoveling up the transport matter, or nipping and gripping the transport matter. The working machine 20 is, for example, a construction machine for performing a construction work, such as an excavator. The following description will be made about the case where the working machine 20 serves as an excavator. The working machine 20 includes a lower travelling body 21, an upper slewing body 23, and an attachment 25.

The lower travelling body 21 causes the working machine 20 to move. The lower travelling body 21 includes, for example, a crawler. The upper slewing body 23 is slewably mounted on the lower travelling body 21. The upper slewing body 23 includes a cab 23a. The cab 23a is a section allowing an operator to operate the working machine 20. The working machine 20 may not be operated by the operator in the cab 23a, but be controlled by an operator outside the working machine 20 (remotely controlled), or may be subjected to an automatic control by a computer.

(Directions of Working Machine 20)

Directions in which the slewing axis of the upper slewing body 23 extends with respect to the lower travelling body 21 are referred to as vertical directions Z. In the vertical directions Z, an aspect (direction) from the lower travelling body 21 to the upper slewing body 23 is referred to as an upward direction Z1, and the opposite direction is referred to as a downward direction Z2. In directions or longitudinal directions X perpendicularly intersecting the vertical directions Z, a direction in which the attachment 25 projects from the upper slewing body 23 is referred to as a forward direction X1, and the opposite direction is referred to as a rearward direction X2. Directions perpendicularly intersecting the vertical directions Z and the longitudinal directions X are referred to as lateral directions Y.

The attachment 25 is a working device for carrying (transferring) and discharging the transport matter (e.g., earth and sand). The attachment 25 includes a boom 25a, an arm 25b, and a leading end attachment 25c. The boom 25a is raisably and lowerably (vertically rotatably) attached to the upper slewing body 23. The arm 25b is rotatably (pushably and pullably) attached to the boom 25a. The leading end attachment 25c is provided on a leading end portion of the attachment 25, and is rotatably attached to the arm 25b. The leading end attachment 25c may be a bucket for shoveling up the transport matter (e.g., earth and sand), or a device (such as a grapple) for nipping and gripping the transport matter.

The transport vehicle position estimating device 30 estimates a position of the transport vehicle 10 with respect to the working machine 20. The transport vehicle position estimating device 30 determines, for example, whether the transport vehicle 10 is located at a position to allow the working machine 20 to discharge the transport matter to the transport vehicle 10. The transport vehicle position estimating device 30 includes a distance image acquiring part 40, a calculation part 50, a first notification part 61, and a second notification part 62.

The distance image acquiring part 40 acquires a distance image of the box bed 12 (distance image including the box bed 12). The distance image is an image which includes dimensional information (information indicative of a spacious length), and has three-dimensional information. The distance image acquiring part 40 measures a distance between the distance image acquiring part 40 and each section of the box bed 12 (details will be described later). Specifically, the distance image acquiring part 40 includes, for example, a Light Detection and Ranging or Laser Imaging Detection and Ranging (LiDAR), or may include a stereo camera, or a Time Of Flight (TOF) sensor.

The distance image acquiring part 40 is provided on the working machine 20. The distance image acquiring part 40 is disposed at a position where the distance image acquiring part 40 can acquire a distance image of the box bed 12 and the surroundings thereof. The distance image acquiring part 40 is disposed (installed), for example, inside the cab 23a, or may be disposed outside the cab 23a. In one example shown in FIG. 1, the distance image acquiring part 40 is disposed on a top surface of the cab 23a. The distance image acquiring part 40 may be disposed at a position outside the working machine 20 (position away from the working machine 20). The calculation part 50, the first notification part 61, and the second notification part 62 may be disposed at a position away from the working machine 20.

The calculation part 50 performs inputting and outputting of a signal, computations such as determination and calculation, and storing of information. The calculation part 50 processes the distance image of the box bed 12 acquired by the distance image acquiring part 40 to calculate the three-dimensional information of the box bed 12. The calculation part 50 constitutes, for example, a controller.

The first notification part 61 generates a notification to a person under the control of the calculation part 50. The first notification part 61 generates a notification of at least one of sound, light, and vibration (details will be described later). The second notification part 62 generates a notification to the person in the similar way to the first notification part 61. The first notification part 61 and the second notification part 62 may be combined into one unit, or separated.

(Operations)

The working machine 20 is configured to operate in the following manner.

(Calculation of Information on Box Bed 12)

The calculation part 50 calculates the three-dimensional information on the box bed 12 (hereinafter, referred to as "box bed information") on the basis of the distance image acquired by the distance image acquiring part 40. The box bed information includes positional information indicative of a three-dimensional position of the box bed 12 with respect to the working machine 20. The box bed information may include shape information indicative of a three-dimensional shape of the box bed 12. The box bed information includes the positional information and the shape information about the entirety of the box bed 12, or may include the positional information and the shape information about a part of the box bed 12. For example, the box bed information may include information on only the part of the box bed 12 that is necessary for calculation of a box bed scope A, which will be described later.

The calculation part 50 may calculate the box bed information on the basis of a plan image indicative of two-dimensional information including the box bed 12 and the distance image of the box bed 12. For example, the box bed information may be calculated as follows. The distance image acquiring part 40 acquires the plan image including the box bed 12 in addition to the distance image including the box bed 12. In this case, the distance image acquiring part 40 further includes an image sensor such as a camera for acquiring the plan image. The calculation part 50 extracts (calculates and estimates) the position of the box bed 12 in the plan image by a program extracting a specific shape from an image. The calculation part 50 extracts the distance image of the box bed 12 from a distance image including the box bed 12 and objects surrounding the box bed 12 on the basis of the position of the box bed 12 in the plan image. The calculation part 50 may extract only a part necessary for the calculation of the box bed scope A, which will be described later, from the plan image and the distance image. The calculation part 50 calculates the box bed information on the basis of the extracted distance image of the box bed 12. The calculation part 50 may calculate the box bed information without using the plan image, when the calculation part 50 can calculate three-dimensional box bed information without using the plan image.

(Summary of Box Bed Scope A, Dischargeable Region B, Preferable Dischargeable Region C)

The calculation part 50 sets (calculates) the box bed scope A indicative of a positional extent of the box bed 12. The calculation part 50 acquires a dischargeable region B indicative of a dischargeable extent of the attachment 25 (dischargeable extent β (see FIG. 2)). Preferably, the calculation part 50 acquires a preferable dischargeable region C (see FIG. 3), which is determined on the basis of an operation efficiency of the attachment 25. The calculation part 50 performs "a transport vehicle position estimation". Specifically, in the transport vehicle position estimation, the calculation part 50 determines whether at least a part of the box bed scope A falls within the dischargeable region B. In the transport vehicle position estimation, the calculation part 50 may determine whether at least a part of the box bed scope A falls within the preferable dischargeable region C (see FIG. 3).

The calculation part 50 may perform the transport vehicle position estimation on the basis of information in the longitudinal directions X, or information in the longitudinal directions X and the vertical directions Z. As shown in FIG. 3, the calculation part 50 may perform the transport vehicle position estimation on the basis of information in the longitudinal directions X and the lateral directions Y (information of an extent when viewed from the vertical directions Z, or an extent in a plan view). The calculation part 50 may perform the transport vehicle position estimation on the basis of information in the longitudinal directions X, the lateral directions Y, and the vertical directions Z (three-dimensional information).

(Setting of Box Bed Scope A)

The calculation part 50 sets the box bed scope A on the basis of the distance image acquired by the distance image acquiring part 40. The box bed scope A is indicative of the positional extent of the box bed 12. The space right above the box bed 12 is referred to as a box bed space α (see FIGS. 1 and 3). The box bed space α is a three-dimensional space having a shape of a column, which corresponds to a locus of virtual parallel movement of the box bed 12 in the upward direction Z1. The calculation part 50 may calculate the box bed space α, alternatively may not calculate it. The details of the box bed scope A are as follows.

(Setting of Box Bed Scope Ax in Longitudinal Directions X)

In the case that the transport vehicle position estimation is performed on the basis of the information in the longitudinal directions X, the calculation part 50 sets a box bed scope Ax which is indicative of the box bed scope A in the longitudinal directions X, for example, in the following manner.

The box bed scope Ax is an extent from an end (or substantially an end) of the box bed space α in the forward direction X1 to an end (or substantially an end) of the box bed space α in the rearward direction X2. Specifically, the end (limit) of the box bed scope Ax in the forward direction X1 is at a position of a surface (specifically, the front surface 13d) which belongs to the flat face part 13 (defined by the surfaces of the box bed 12) and is farthest away from the working machine 20 when the upper slewing body 23 faces the box bed 12. The expression "the upper slewing body 23 faces the box bed 12" means that the box bed 12 is located in front of the upper slewing body 23 in the forward direction X1 (hereinafter, the same). Further, the expression "the upper slewing body 23 faces the box bed 12" means that one surface of the flat face part 13 perpendicularly intersects the longitudinal directions X. The end of the box bed scope Ax in the forward direction X1 is at a position which the front surface 13d lies at or is off the front surface 13d (e.g., position in the vicinity of the front surface 13d, or inside the box bed 12). This is applied to relationships between the box bed scope A and the box bed 12 which are described below. The end of the box bed scope Ax in the rearward direction X2 is a position at which the closest surface (specifically, the rear surface 13b) of the flat face part 13 to the working machine 20 lies when the upper slewing body 23 faces the box bed 12.

In a case that the front surface 13d does not perpendicularly intersect (is oblique to) the longitudinal directions X, the end of the box bed scope Ax in the forward direction X1 may be assumed to be the most rearward position of the front surface 13d in the rearward direction X2. In a case that the rear surface 13b does not perpendicularly intersect the longitudinal directions X, the end of the box bed scope Ax in the rearward direction X2 may be assumed to be the most forward position of the rear surface 13b in the forward direction X1.

(Setting of Box Bed Scope Az in Vertical Directions Z)

In the case that the transport vehicle position estimation is performed on the basis of the information in the vertical directions Z, the calculation part 50 sets a box bed scope Az indicative of a vertical directional part of the box bed scope A, for example, in the following manner. The box bed scope Az is an extent in the upward direction Z1 from an end of the box bed space α in the downward direction Z2. Specifically, the end of the box bed scope Az in the downward direction Z2 is a position of a specific portion of the box bed 12. More specifically, the end of the box bed scope Az in the downward direction Z2 may be a position of an end portion of the side surfaces 13c and the rear surface 13b in the upward direction Z1, or may be a position of the floor surface 13a, or a position of an end portion of the front surface 13d in the upward direction Z1. The end of the box bed scope Az in the upward direction Z1 may not be set, alternatively may be set, for example, at a position at a predetermined height from the box bed 12.

(Setting of Box Bed Scope Axz in Longitudinal Directions X and Vertical Directions Z)

In the case that the transport vehicle position estimation is performed on the basis of the information in the longitudinal directions X and the vertical directions Z, the calculation part 50 sets a box bed scope Axz indicative of a longitudinal directional and vertical directional part of the box bed scope A, for example, in the following manner. The box bed scope Axz is the same or substantially the same as the extent of the box bed space α in the lateral directions Y, that is, a planar scope defined by the box bed scope Ax and the box bed scope Az.

(Setting of Box Bed Scope Axy in Longitudinal Directions X and Lateral Directions Y)

Figure 3:
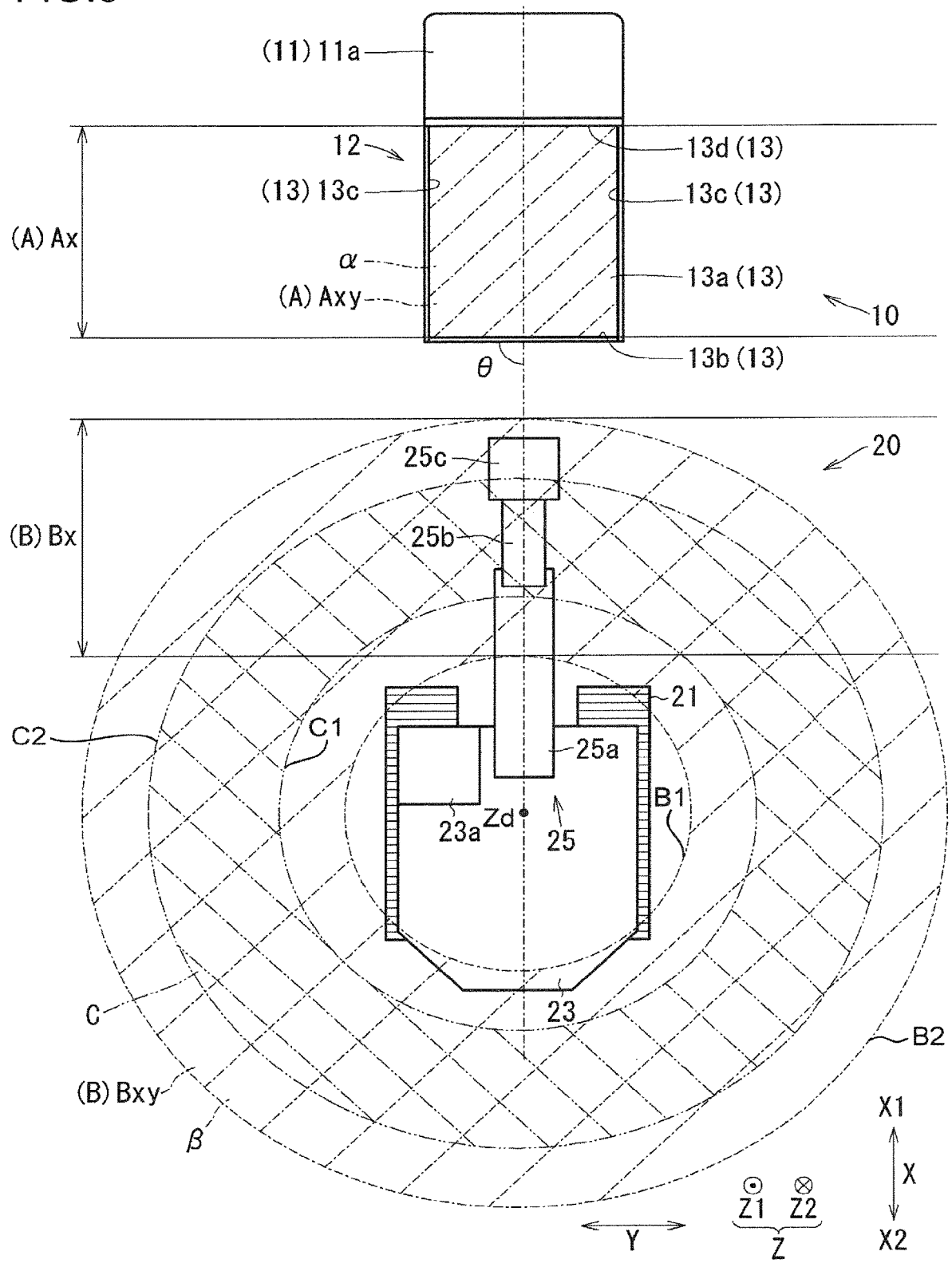
FIG. 3 is a plan view of the transport vehicle 10 and the working machine 20 shown in FIG. 1.

As shown in FIG. 3, in the case that the transport vehicle position estimation is performed on the basis of the information in the longitudinal directions X and the lateral directions Y, the calculation part 50 sets a box bed scope Axy indicative of a longitudinal directional and lateral directional part of the box bed scope A, for example, in the following manner. The box bed scope Axy is the same or substantially the same as the extent of the box bed space α in the vertical directions Z (e.g., in a plan view). Specifically, the box bed scope Axy is an internal area of the box bed 12 into which the transporting matter is placed in the vertical directions Z. More specifically, the box bed scope Axy is an area defined by the rear surface 13b, the right and left side surfaces 13c, and the front surface 13d. The box bed scope Axy is an area overlapping the floor surface 13a in the vertical directions Z.

(Setting of Box Bed Scope A Based on Three-Dimensional Information)

The transport vehicle position estimation may be performed on the basis of the information in the longitudinal directions X, the lateral directions Y, and the vertical directions Z (three-dimensional information). In this case, the box bed scope A based on the three-dimensional information is the same as the box bed space α.

(Acquisition of Dischargeable Region B)

Figure 2:
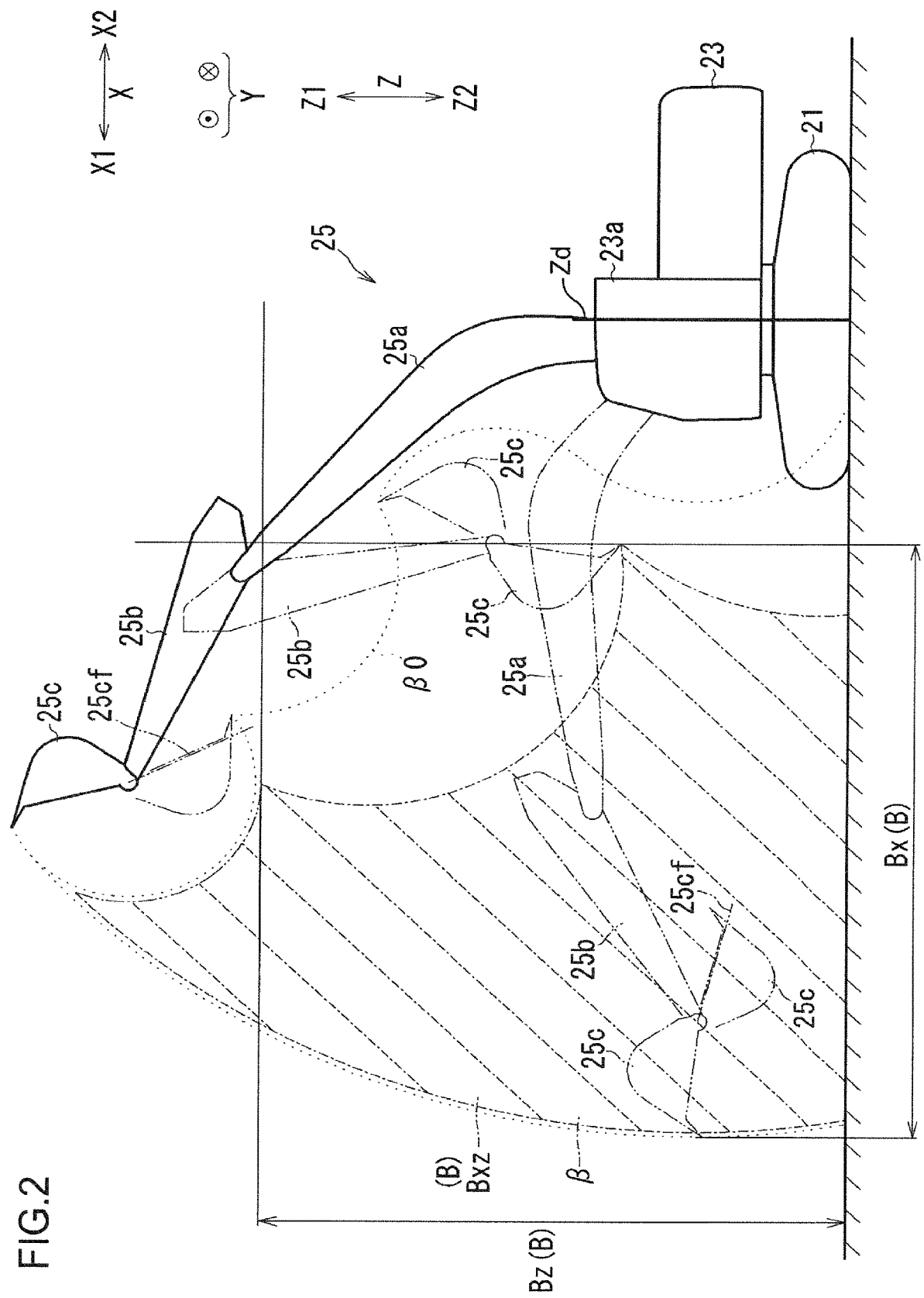

The calculation part 50 acquires a dischargeable region B shown in FIG. 2. The dischargeable region B is indicative of a dischargeable extent of the leading end attachment 25c (dischargeable extent β described below). The calculation part 50 stores the dischargeable region B in a memory in advance, or may calculate the dischargeable region B.

The dischargeable extent of the leading end attachment 25c under the condition that the attachment 25 is operated but the lower travelling body 21 is not travelled is referred to as a dischargeable extent β. The dischargeable extent β has a three-dimensional shape in a substantially ring form (see FIGS. 2 and 3). The expression "the attachment 25 is operated" means, for example, at least one of the following operations [Example 1a] to [Example 1d]. [Example 1a] Rotation of the boom 25a with respect to the upper slewing body 23. [Example 1b] Rotation of the arm 25b with respect to the boom 25a. [Example 1c] Rotation of the leading end attachment 25c with respect to the arm 25b. [Example 1d] Rotation (slewing) of the attachment 25 with respect to the lower travelling body 21 caused by the slewing of the upper slewing body 23 with respect to the lower travelling body 21.

The dischargeable extent β is determined on the basis of information on the attachment 25. Specifically, the dischargeable extent β is determined on the basis of dimensions of each component of the attachment 25 (e.g., the boom 25a), and a possible range of an angle for each component of the attachment 25 (e.g., a range of an angle in which the boom 25a may be raised and lowered with respect to the upper slewing body 23). The calculation part 50 may calculate the dischargeable extent β, alternatively may not calculate it.

Among the positions at which the leading end attachment 25c can be set, positions at which the transport matter is not supposed to be discharged from the leading end attachment 25c may not be included in the dischargeable extent β. Specifically, for example, a position in the downward direction Z2 below an end of the lower travelling body 21 in the downward direction Z2 is not to be included, or alternatively may be included in the dischargeable extent β. Further, a region in the rearward direction X2 behind an end portion of the lower travelling body 21 in the forward direction X1, where it is not possible (or is difficult) to locate the box bed 12 (see FIG. 1), may not be included in the dischargeable extent β.

As shown in FIG. 2, in the case that the leading end attachment 25c is a bucket, rotation of the leading end attachment 25c with respect to the arm 25b causes the transport matter to be discharged from the leading end attachment 25c. Therefore, a region defined by a locus of the leading end attachment 25c for the discharge of the transport matter may not be included in the dischargeable extent β. In the case that the leading end attachment 25c is a device for nipping and gripping the transport matter, it is not necessary to rotate the leading end attachment 25c with respect to the arm 25b when discharging the transport matter. In this case, the dischargeable extent β may be within or may be substantially within a movable extent β0 of a leading end portion of the leading end attachment 25c.

(Acquisition of Dischargeable Region Bx in Longitudinal Directions X)

In the case that the transport vehicle position estimation is performed on the basis of the information in the longitudinal directions X, the calculation part 50 acquires a dischargeable region Bx which is indicative of the dischargeable region B in the longitudinal directions X. For example, the end (limit) of the dischargeable region Bx in the forward direction X1 is at a position of an end of the dischargeable extent β in the forward direction X1. Specifically, the end of the dischargeable region Bx in the forward direction X1 is at the most forward position in the forward direction X1 in the dischargeable extent of the leading end attachment 25c under the condition that the attachment 25 is operated but the lower travelling body 21 is not travelled. The end of the dischargeable region Bx in the forward direction X1 is at, or may be off a position of the end of the dischargeable extent β in the forward direction X1. This is applied to relationships between the dischargeable region B and the dischargeable extent β which are described below. The end of the dischargeable region Bx in the rearward direction X2 is at a position of an end of the dischargeable extent β in the rearward direction X2.

(Acquisition of Dischargeable Region Bz in Vertical Directions Z)

In the case that the transport vehicle position estimation is performed on the basis of the information in the vertical directions Z, the calculation part 50 acquires a dischargeable region Bz in the vertical directions Z. For example, the end of the dischargeable region Bz in the upward direction Z1 is at a position of an end of the dischargeable extent β in the upward direction Z1. The end of the dischargeable region Bz in the downward direction Z2 is at a position of an end of the dischargeable extent β in the downward direction Z2.

(Acquisition of Dischargeable Region Bxz in Longitudinal Directions X and Vertical Directions Z)

In the case that the transport vehicle position estimation is performed on the basis of the information in the longitudinal directions X and the vertical directions Z, the calculation part 50 acquires a dischargeable region Bxz in the longitudinal directions X and the vertical directions Z. The dischargeable region Bxz is an extent of the dischargeable extent β in the lateral directions Y. The dischargeable extent β has a three-dimensional shape equal to a locus formed by rotation of the dischargeable region Bxz shown in FIG. 2 around the slewing axis Zd of the upper slewing body 23. Thus, only a part of the dischargeable region Bxz is shown in FIG. 2. Precisely, in addition to the dischargeable region Bxz shown in FIG. 2, the dischargeable region Bxz includes a spatial extent around the slewing axis Zd.

(Acquisition of Dischargeable Region Bxy in Longitudinal Directions X and Lateral Directions Y)

As shown in FIG. 3, in the case that the transport vehicle position estimation is performed on the basis of the information with respect to the longitudinal directions X and the lateral directions Y, the calculation part 50 acquires a dischargeable region Bxy in the longitudinal directions X and the lateral directions Y. The dischargeable region Bxy is an extent of the dischargeable extent β in the vertical directions Z. For example, the dischargeable region Bxy is an annular area defined by a circle B1 having the center at the slewing axis Zd of the upper slewing body 23 and a circle B1 having a larger diameter than the circle B1 and the center at the slewing axis Zd. The dischargeable region Bxy shown in FIG. 3 is a cross section of the dischargeable extent β shown in FIG. 2 at a position in the vertical directions Z, the cross section being parallel to a horizontal plane.

(Acquisition of Dischargeable Region B Based on Three-Dimensional Information)

In the case that the transport vehicle position estimation is performed on the basis of the information in the longitudinal directions X, the lateral directions Y, and the vertical directions Z (three-dimensional information), the calculation part 50 acquires the dischargeable region B on the basis of the three-dimensional information. The dischargeable region B on the basis of the three-dimensional information is the same as the extent of the dischargeable extent β.

(Acquisition of Preferable Dischargeable Region C)

The calculation part 50 acquires a preferable dischargeable region C. The preferable dischargeable region C is narrower than the dischargeable region B. The preferable dischargeable region C is determined on the basis of the operation efficiency of the attachment 25. The calculation part 50 stores in advance, or may calculate the preferable dischargeable region C. Specifically, the preferable dischargeable region C is set, for example, as follows.

The end (limit) of the preferable dischargeable region C in the forward direction X1 may be set at a position in the rearward direction X2 from the end of the dischargeable region B in the forward direction X1. Specifically, the preferable dischargeable region C in the vertical directions Z is an annular area defined by a circle C1 having the center at the slewing axis Zd and by a circle C2 having a larger diameter than the circle C1 and the center at the slewing axis Zd. The diameter of the circle C1 is larger than that of the circle B1, and the diameter of the circle C2 is smaller than that of the circle B2, for the following reasons. [Reason 2a] A smaller distance from the slewing axis Zd of the upper slewing body 23 to the end of the leading end attachment 25*c* in the forward direction X1 (operation diameter) enables the working machine 20 to be stabilized, thereby ensuring the good operation efficiency. [Reason 2b] A smaller operation diameter enables the slewing acceleration of the upper slewing body 23 with respect to the lower travelling body 21 to be increased, thereby reducing the operation time and ensuring the good operation efficiency. [Reason 2c] A smaller operation diameter can reduce the energy necessary for the upper slewing body 23 to slew, thereby ensuring the good operation efficiency. [Reason 2d] Comparing to the maximum or substantially the maximum operation diameter, a smaller operation diameter enables the attachment 25 to have a higher degree of freedom for its posture, thereby ensuring the good operation efficiency.

[Reason 2e] The preferable dischargeable region C shown in FIG. 3 may be set in view of whether the transport matter can be carried efficiently by the leading end attachment 25*c*. Specific explanation is as follows. As shown in FIG. 2, a plane passing through a base end portion and the leading end portion of the leading end attachment 25*c* serving as the bucket is assumed to be a plane 25*cf*. When the operation diameter is large (i.e., the maximum or substantially the maximum), the lengthwise direction of the arm 25*b* is horizontal or substantially horizontal. In this state, the plane 25*cf* on the leading end attachment 25*c* cannot be made to extend in the horizontal direction (or substantially the horizontal direction) even by expanding or contracting a cylinder (not shown) to rotate the leading end attachment 25*c* with respect to the arm 25*b*. Therefore, a carriage amount of transport matter of the leading end attachment 25*c* can be seen to be limited. On the other hand, when the operation diameter is smaller than the maximum or substantially the maximum, the plane 25*cf* of the leading end attachment 25*c* can be made to extend in the horizontal direction. Therefore, the carriage amount of transport matter of the leading end attachment 25*c* is not limited, thereby ensuring the good operation efficiency.

As shown in FIG. 3, the end (limit) of the preferable dischargeable region C in the rearward direction X2 may be set at a position in the forward direction X1 from the end of the dischargeable region B in the rearward direction X2 for the following reasons. [Reason 3a] When the operation diameter is larger than the minimum or substantially the minimum, there is not likelihood that the leading end attachment 25*c* comes into contact with the cab 23*a*, and a function of preventing the leading end attachment 25*c* from coming into contact with the cab 23*a* will work. Accordingly, the good operation efficiency can be assured. In the example shown in FIG. 2, the leading end attachment 25*c* can be seen not to come into contact with the cab 23*a*. However, there is likelihood that the leading end attachment 25*c* comes into contact with the cab 23*a* due to certain dimensions and shapes of the attachment 25. [Reason 3b] Comparing to the minimum or substantially the minimum operation diameter, a larger operation diameter enables the attachment 25 to have a higher degree of freedom for its posture, which ensures the good operation efficiency.

In the case that the transport vehicle position estimation is performed on the basis of the information in the longitudinal directions X, the calculation part 50 may acquire a preferable dischargeable region C in the longitudinal directions X (see FIG. 3) (similarly in the other directions). Preferable dischargeable regions C may be set in a plurality of steps (preferable extent, more preferable extent, still more preferable extent).

(Transport Vehicle Position Estimation)

The calculation part 50 determines whether at least a part of the box bed scope A shown in FIG. 3 falls within the dischargeable region B. For example, in the case that the transport vehicle position estimation is performed on the basis of the information in the longitudinal directions X, the calculation part 50 determines whether at least a part of the box bed scope Ax in the longitudinal directions X falls within the dischargeable region Bx in the longitudinal directions X. In the case that the transport vehicle position estimation is performed on the basis of the information in the vertical directions Z, the calculation part 50 determines whether at least a part of the box bed scope Az in the vertical directions Z falls within the dischargeable region Bz in the vertical directions Z. In the case that the transport vehicle position estimation is performed on the basis of the information in the longitudinal directions X and the vertical directions Z, the calculation part 50 determines whether at least a part of the box bed scope Axz in the longitudinal directions X and the vertical directions Z falls within the dischargeable region Bxz in the longitudinal directions X and the vertical directions Z. In the case that the transport vehicle position estimation is performed on the basis of the information in the longitudinal directions X and the lateral directions Y, the calculation part 50 determines whether at least a part of the box bed scope Axy in the longitudinal directions X and the lateral directions Y falls within the dischargeable region Bxy in the longitudinal directions X and the lateral directions Y. In the case that the transport vehicle position estimation is performed on the basis of the information in the longitudinal directions X, the lateral directions Y, and the vertical directions Z, the calculation part 50 determines whether at least a part of the box bed scope A in the longitudinal directions X, the lateral directions Y, and the vertical directions Z falls within the dischargeable region B in the longitudinal directions X, the lateral directions Y, and the vertical directions Z.

The calculation part 50 determines whether at least a part of the box bed scope A falls within the preferable dischargeable region C. The calculation part 50 may determine whether the entire of the box bed scope A falls within the dischargeable region B. The calculation part 50 may determine whether the entire of the box bed scope A falls within the preferable dischargeable region C.

(Output According to Results of Estimation)

The calculation part 50 outputs a signal according to the results of estimation. Signals output by the calculation part 50 can be used in various ways. For example, a signal output by the calculation part 50 is used for a control, or may be used for a notification described below, or may include information indicative of a value.

(Notification)

The calculation part 50 causes the first notification part 61 to generate a notification by outputting a signal to generate the notification when at least a part of the box bed scope A shown in FIG. 1 falls within the dischargeable region B. The calculation part 50 does not cause the first notification part 61 to generate a notification when the box bed scope A does not fall within the dischargeable region B. The first notification part 61 notifies that the transport vehicle 10 is located at a position to allow an operation of discharging the transport matter. The first notification part 61 generates a notification (a sign) to, for example, a driver in the transport vehicle 10. The notification of the first notification part 61 is at least one of sound, light, and vibration as described above. Specifically, the first notification part 61 is a sound outputting part (e.g., a horn or a speaker) in at least one of the transport vehicle 10 and the working machine 20. The first notification part 61 may be a light outputting part (e.g., a screen or a light), or a vibration generating device with which the driver in the transport vehicle 10 comes into contact, provided in at least one of the transport vehicle 10 and the working machine 20.

The calculation part 50 causes the second notification part 62 to generate a notification by outputting a signal to generate the notification when at least a part of the box bed scope A falls within the preferable dischargeable region C (see FIG. 3). The calculation part 50 does not cause the second notification part 62 to generate a notification when the box bed scope A does not fall within the preferable dischargeable region C (see FIG. 3). The second notification part 62 notifies that the transport vehicle 10 is located at a preferable position to allow the operation of discharging the transport matter. The second notification part 62 generates a notification (a sign) to, for example, the driver in the transport vehicle 10. The specific configuration of the notification of the second notification part 62 is similar to that of the first notification part 61. The notification of the second notification part 62 is different from that of the first notification part 61. For example, the notification of the first notification part 61 and the notification of the second notification part 62 are different from each other in tones and contents of sound; colors, intensities, blinking patterns of light; or patterns of vibration.

The calculation part 50 may cause the generation of the notification when the entire of the box bed scope A falls within the dischargeable region B. The calculation part 50 may cause the generation of the notification when the entire of the box bed scope A falls within the preferable dischargeable region C.

(Output of Information)

The calculation part 50 may output information indicative of a distance necessary to move the transport vehicle 10 until the box bed scope A falls within the dischargeable region B (a remaining distance) when the box bed scope A does not fall within the dischargeable region B. Similarly, the calculation part 50 may output information indicative of a distance necessary to move the transport vehicle 10 until the box bed scope A falls within the preferable dischargeable region C (a remaining distance) when the box bed scope A does not fall within the preferable dischargeable region C. The information indicative of the remaining distance may be notified, for example, to the driver in the transport vehicle 10 by sound or indication (the same is applied to the following information indicative of a moving direction).

The calculation part 50 may output information indicative of a moving direction of the transport vehicle 10 to make the box bed scope A fall within the dischargeable region B when the box bed scope A does not fall within the dischargeable region B (the same is applied to the preferable dischargeable region C). Specifically, the calculation part 50 calculates and outputs an angle $\theta$ shown in FIG. 3 on the basis of the distance image acquired by the distance image acquiring part 40. The angle $\theta$ is an angle (inclination) of the flat face part 13 of the box bed 12 with respect to the upper slewing body 23 (working machine 20). In other words, the angle $\theta$ is, for example, an angle between the longitudinal directions X and the flat face part 13. Specifically, the angle $\theta$ is an angle between the longitudinal directions X and the closest surface of the flat face part 13 of the box bed 12 (e.g., the rear surface 13$b$ in FIG. 3) to the upper slewing body 23. The calculation part 50 may calculate and output information indicative of the angle $\theta$ when the box bed scope A falls within the dischargeable region B (the same is applied to the preferable dischargeable region C).

(Other Output)

The calculation part 50 may output a signal indicating that the box bed scope A falls within the dischargeable region B when at least a part of the box bed scope A falls within the dischargeable region B (the same is applied to the preferable dischargeable region C). The calculation part 50 may output a signal for a purpose other than the notification by the first notification part 61 and the second notification part 62.

(Remote or Automatic Control of Working Machine 20)

In the case that there is an operator in the cab 23$a$ of the working machine 20 shown in FIG. 1, the operator can determine whether the transport vehicle 10 is at a position to allow the operation of discharging the transport matter. In this case, the operator can send a notification (specifically, a sign to stop) to the driver in the transport vehicle 10 when the transport vehicle 10 reaches a position to allow the operation of discharging the transport matter. On the other hand, in the case that the working machine 20 is automatically controlled, the determination by the operator as described above is not available. In this case, it is desirable to automatically determine whether the transport vehicle 10 is at a position to allow the operation of discharging the transport matter. In the case that the working machine 20 is remotely controlled, the operator controls the working machine 20 while looking at a screen. In this case, it is difficult for the operator to estimate the distance from the working machine 20 to the transport vehicle 10, and therefore difficult to determine whether the transport vehicle 10 is at a position to allow the operation of discharging the transport matter. On the other hand, the transport vehicle position estimating device 30 in this embodiment can automatically determine whether the transport vehicle 10 is at a position to allow the operation of discharging the transport matter. In this embodiment, there may be an operator in the cab 23$a$, without utilizing automatic or remote control of the working machine 20.

Effects

The effects exerted by the transport vehicle position estimating device in the above-described embodiment are as follows.

A transport vehicle position estimating device is used in a working machine having an attachment. The attachment is configured to carry and discharge a load of matter to a box bed provided on a transport vehicle. The transport vehicle position estimating device includes a distance image acquiring part and a calculation part.

The distance image acquiring part acquires a distance image of a box bed. The calculation part sets a box bed scope indicative of a positional extent of the box bed on the basis of the distance image of the box bed acquired by the distance image acquiring part.

The calculation part acquires a dischargeable region indicative of a dischargeable extent of the attachment. The calculation part determines whether at least a part of the box bed scope falls within the dischargeable region.

In this configuration, the calculation part automatically determines whether at least a part of the box bed scope A of the transport vehicle falls within the dischargeable region of the working machine. Thus, the calculation part can automatically determine whether the transport vehicle is located at such a position that the box bed scope falls within the dischargeable region. The box bed scope is set on the basis of the distance image of the box bed. Accordingly, even when the box bed is changed, a box bed scope of the changed box bed is set on the basis of a distance image thereof. Therefore, even when the kind of transport vehicle is changed, it can be automatically determined whether the box bed scope falls within the dischargeable region. Accordingly, the position of the transport vehicle with respect to the working machine can be estimated even when the kind of transport vehicle is changed.

Further, the working machine includes a lower travelling body and an upper slewing body capable of slewing with respect to the lower travelling body.

The calculation part sets the dischargeable region in at least a part of a space in a longitudinal direction of the upper slewing body between a surface farthest from the upper slewing body and a surface closest to the upper slewing body among the plurality of surfaces of the box bed when the upper slewing body is in a specific posture. The specific posture renders the longitudinal direction perpendicularly intersecting one of the plurality of surfaces.

In this configuration, the box bed scope is set, for example, in at least a part of a space between two surfaces (e.g., a rear surface 13b and a front surface 13d) on the opposite ends in the longitudinal directions. Thus, the box bed scope can be set in a preferable region on the basis of the position of the box bed. Accordingly, the transport matter can be loaded to the box bed by the attachment more reliably when it is determined that the box bed scope falls within the dischargeable region.

The box bed scope is set in at least a part of a space above the box bed.

In this configuration, the box bed scope is set in at least a part of a space above the box bed. Thus, the box bed scope can be set in a preferable region on the basis of the position of the box bed. Accordingly, the transport matter can be loaded to the box bed by the attachment more reliably when it is determined that the box bed scope falls within the dischargeable region.

The box bed scope is set in at least a part of an area overlapping the box bed in a plan view.

In this configuration, the box bed scope is set in at least a part of an area overlapping the box bed in a plan view. Thus, the box bed scope can be set in a preferable region on the basis of the position of the box bed. Accordingly, the transport matter can be loaded to the box bed by the attachment more reliably when it is determined that the box bed scope falls within the dischargeable region.

The transport vehicle position estimating device further includes a first notification part for generating a notification of at least one of sound, light, and vibration. The calculation part causes the first notification part to generate the notification when at least a part of the box bed scope falls within the dischargeable region.

This configuration enables to notify a person (e.g., a driver in the transport vehicle) that at least a part of the box bed scope falls within the dischargeable region.

The calculation part outputs information indicative of a movement distance of the transport vehicle until at least a part of the box bed scope falls within the dischargeable region when the box bed scope is out of the dischargeable region.

This configuration of outputting information indicative of a movement distance of the transport vehicle until at least a part of the box bed scope falls within the dischargeable region enables to transmit information on a remaining distance to a person (e.g., a driver in the transport vehicle) or a computer.

The calculation part acquires a preferable dischargeable region narrower than the dischargeable region and determines whether at least a part of the box bed scope A falls within the preferable dischargeable region.

In this configuration, the preferable dischargeable region is determined on the basis of efficiency of an operation (hereinafter, simply referred to as "operation") by the attachment. Specifically, the preferable dischargeable region is set such that the operation has a better efficiency when performing within the preferable dischargeable region than when performing out of the preferable dischargeable region. Accordingly, the operation efficiency can be improved when the operation is performed within the preferable dischargeable region.

The transport vehicle position estimating device further includes a second notification part for generating a notification of at least one of sound, light, and vibration. The calculation part causes the second notification part to generate the notification when at least a part of the box bed scope falls within the preferable dischargeable region.

This configuration enables to notify a person (e.g., a driver in the transport vehicle) that at least a part of the box bed scope falls within the preferable dischargeable region.

The calculation part outputs information indicative of a movement distance of the transport vehicle 10 until the box bed scope falls within the preferable dischargeable region when the box bed scope is out of the preferable dischargeable scope.

This configuration of outputting information indicative of a movement distance of the transport vehicle until the box bed scope falls within the preferable dischargeable region enables to transmit information on a remaining distance to a person (e.g., a driver in the transport vehicle) or a computer.

The calculation part calculates and outputs an angle of a flat face part of the box bed to the working machine on the basis of the distance image acquired by the distance image acquiring part.

This configuration of outputting the angle enables to transmit an angle to a person (e.g., a driver in the transport vehicle) or a computer.

The calculation part determines that the box bed scope falls within the dischargeable region when at least a longitudinal directional part of the box bed scope falls within a longitudinal directional part of the dischargeable region.

This configuration enables determination as to whether at least a part of the box bed scope falls within the dischargeable region by observing the longitudinal directions.

The calculation part determines that the box bed scope falls within the dischargeable region when at least a vertical directional part of the box bed scope falls within a vertical directional part of the dischargeable region.

This configuration enables determination as to whether at least a part of the box bed scope falls within the dischargeable region by observing the vertical directions.

The calculation part determines that the box bed scope falls within the dischargeable region when at least a longitudinal directional and lateral directional part of the box bed scope falls within a longitudinal directional and lateral directional part of the dischargeable region.

This configuration enables determination as to whether at least a part of the box bed scope falls within the dischargeable region by observing the longitudinal directions and vertical directions.

MODIFICATIONS

The embodiment described above may include various modifications. For example, the disposition and the shape of each component in the embodiment may be changed. The number of components may be changed, or alternatively some components may be omitted. Components described as members or parts different from each other may be combined into one member or one part. A component described as a member or a part may be separately provided as members or parts different from each other. The box bed space α and the box bed scope A may be a predetermined region or extent with respect to the box bed 12, but this predetermined region or extent may be changed manually, or changed automatically according to a condition (the same is applied to the dischargeable extent β, the dischargeable region B, and the preferable dischargeable region C).

The invention claimed is:

1. A transport vehicle position estimating device for use in a working machine having an attachment for carrying and discharging a load of matter to a box bed provided on a transport vehicle, comprising:
    a distance image sensor for acquiring a distance image of the box bed;
    an output device; and
    a calculation part constituting a controller, wherein
    the calculation part
        sets a box bed scope indicative of a positional extent of the box bed on the basis of the distance image of the box bed acquired by the distance image sensor,
        acquires a dischargeable region indicative of a dischargeable extent of the attachment,
        acquires a preferable dischargeable region narrower than the dischargeable region,
        determines whether at least a part of the box bed scope falls within the dischargeable region, and
        determines whether at least a part of the box bed scope falls within the preferable dischargeable region,
    the output device is configured as either a sound output device, a light output device, or a vibration device for outputting information indicating that the transport vehicle is located at a position to allow an operation of discharging the load of matter, and
    the calculation part causes the output device to output a first notification when at least the part of the box bed scope falls within the dischargeable region, and causes the output device to output a second notification that is different from the first notification when at least the part of the box bed scope falls within the preferable dischargeable region.

2. The transport vehicle position estimating device according to claim 1, wherein
    the working machine includes:
        a lower travelling body; and
        an upper slewing body capable of slewing with respect to the lower travelling body,
    the box bed has a bottom surface and a plurality of surfaces surrounding the bottom surface,
    the calculation part sets the dischargeable region in at least a part of a space in a longitudinal direction of the upper slewing body between a surface farthest from the upper slewing body and a surface closest to the upper slewing body among the plurality of surfaces of the box bed when the upper slewing body is in a specific posture, and
    the specific posture renders the longitudinal direction perpendicularly intersecting one of the plurality of surfaces.

3. The transport vehicle position estimating device according to claim 2, wherein
    the calculation part determines that the box bed scope falls within the dischargeable region when at least a longitudinal directional part of the box bed scope falls within a longitudinal directional part of the dischargeable region.

4. The transport vehicle position estimating device according to claim 1, wherein
    the box bed scope is set in at least a part of a space above the box bed.

5. The transport vehicle position estimating device according to claim 4, wherein
    the calculation part determines that the box bed scope falls within the dischargeable region when at least a vertical directional part of the box bed scope falls within a vertical directional part of the dischargeable region.

6. The transport vehicle position estimating device according to claim 1, wherein
    the box bed scope is set in at least a part of an area overlapping the box bed in a plan view.

7. The transport vehicle position estimating device according to claim 6, wherein
    the calculation part determines that the box bed scope falls within the dischargeable region when at least a longitudinal directional and lateral directional part of the box bed scope falls within a longitudinal directional and lateral directional part of the dischargeable region.

8. The transport vehicle position estimating device according to claim 1, further comprising a first notification part for generating a notification of at least one of sound, light, and vibration, wherein
    the calculation part causes the first notification part to generate the notification when at least a part of the box bed scope falls within the dischargeable region.

9. The transport vehicle position estimating device according to claim 1, further comprising a second notification part for generating a notification of at least one of sound, light, and vibration, and
    the calculation part causes the second notification part to generate the notification when at least a part of the box bed scope falls within the preferable dischargeable region.

10. The transport vehicle position estimating device according to claim 1, wherein the calculation part outputs information indicative of a movement distance of the transport vehicle until the box bed scope falls within the preferable dischargeable region when the box bed scope is out of the preferable dischargeable scope.

11. The transport vehicle position estimating device according to claim 1, wherein
the calculation part calculates and outputs an angle of a surface of the box bed to the working machine on the basis of the distance image acquired by the distance image sensor.

12. A transport vehicle position estimating device for use in a working machine having an attachment for carrying and discharging a load of matter to a box bed provided on a transport vehicle, comprising:
a distance image acquiring part for acquiring a distance image of the box bed;
an output device; and
a calculation part, wherein
the calculation part
sets a box bed scope indicative of a positional extent of the box bed on the basis of the distance image of the box bed acquired by the distance image acquiring part,
acquires a dischargeable region indicative of a dischargeable extent of the attachment,
acquires a preferable dischargeable region narrower than the dischargeable region,
determines whether at least a part of the box bed scope falls within the dischargeable region,
determines whether at least a part of the box bed scope falls within the preferable dischargeable region, and
the output device is configured for outputting information indicating that the transport vehicle is located at a position to allow an operation of discharging the load of matter, and
the calculation part causes the output device to output a first notification when at least the part of the box bed scope falls within the dischargeable region, and causes the output device to output a second notification that is different from the first notification when at least the part of the box bed scope falls within the preferable dischargeable region.

* * * * *